United States Patent [19]

Sugano

[11] 4,387,793
[45] Jun. 14, 1983

[54] CLUTCH MOTOR ARRANGEMENT

[75] Inventor: Nobukazu Sugano, Toyonaka, Japan

[73] Assignee: Matsushita Electric Industrial Co., Ltd., Osaka, Japan

[21] Appl. No.: 210,571

[22] Filed: Nov. 26, 1980

[30] Foreign Application Priority Data

Nov. 26, 1979 [JP] Japan ................................. 54-153322
Feb. 12, 1980 [JP] Japan ................................... 55-16265

[51] Int. Cl.³ .............................................. B60K 41/02
[52] U.S. Cl. ............................. 192/0.02 R; 192/0.096
[58] Field of Search ............ 192/0.02 R, 0.094, 0.096, 192/111 R, 3.55, 3.54, 18 B, 12 D, 0.084; 112/220, 277, 275

[56] References Cited

U.S. PATENT DOCUMENTS

| 2,533,968 | 12/1950 | Sobie | 192/0.084 |
| 2,666,509 | 1/1954 | Jaggi | 192/0.02 R |
| 3,590,969 | 7/1971 | Kajitani et al. | 192/18 B |
| 3,702,127 | 11/1972 | Yokoyama | 192/12 D |

Primary Examiner—George H. Krizmanich
Attorney, Agent, or Firm—Wenderoth, Lind & Ponack

[57] ABSTRACT

An improved clutch motor arrangement to be used, for example, for driving industrial sewing machines and the like, which is provided with a detection device for detecting functioning of a clutch mechanism and a control device for controlling voltages to be applied to the motor, and arranged to lower the impressed voltage during non-load operation of the motor to a minimum necessary value required for the motor to rotate at a speed in the vicinity of synchronous speed for reducing power consumption during the non-load operation.

8 Claims, 14 Drawing Figures

CLUTCH MOTOR ARRANGEMENT

BACKGROUND OF THE INVENTION

The present invention generally relates to an electric motor and more particularly, to a clutch motor arrangement to be used, for example, for driving industrial sewing machines and the like, which is provided with a detection device for detecting functioning of a clutch mechanism and a control device for controlling voltages to be applied to the motor, and which is arranged to lower the impressed voltage during non-load operation of the motor to a minimum necessary value required for the motor to rotate at a speed in the vicinity of synchronous speed for reducing power consumption at the non-load operation.

Commonly, in sewing machines particularly for industrial purposes, very fast rising speeds and frequent on off functioning or inching functions are required and therefore, clutch motors employed for driving such sewing machines have considerably large power consumption, since fly wheels with a large moment of inertia are rotated at a speed close to the synchronous speed at all times, while the full power source voltage is applied to the motor even during a non-load period in which the sewing machines are not driven. Especially, in a single-phase clutch motor which occupies the majority of clutch motors, the power consumption as described above is particularly large owing to the characteristics inherent in single-phase induction motors.

Meanwhile, in the actual state of sewing work with the use of industrial sewing machines, since the working efficiency of the sewing machine is lower than 30%, the clutch motor is undesirably subjected to the non-load operation, while wasting a large amount of power for the time period more than 70%.

Conventionally, no particular countermeasures have been conceived for reduction of the power consumption during the non-load period as described above, and even if any measure is adopted, such a countermeasure has been limited only to some consideration taken during the designing of the motor main body in order to decrease the non-load loss of the motor even to a slight extent.

SUMMARY OF THE INVENTION

Accordingly, an essential object of the present invention is to provide a clutch motor arrangement of energy saving type for use, for example, in industrial sewing machines and the like, and which has exactly the same performance as conventional clutch motors, but with the power consumption being reduced.

Another important object of the present invention is to provide a clutch motor arrangement of the above described type in which vibrations and noises of the motor are suppressed during shut-down of the sewing machine through lowering of the voltage impressed to the motor during such shut-down period.

A further object of the present invention is to provide a clutch motor arrangement of the above described type which is readily applicable to any existing clutch motor for the reduction of power consumption.

A still further object of the present invention is to provide a clutch motor arrangement of the above described type which is provided with a detection device of non-contact type to detect functioning of a clutch mechanism for positive operation without being affected by side plays arising from abrasions and dimensional tolerances of each part of the clutch motor, and giving no adverse effect to the functioning of a clutch lever.

Another object of the present invention is to provide a clutch motor arrangement of the above described type which is simple in construction and stable in functioning, and which can be readily incorporated into industrial sewing machines of various, types at low cost.

In accomplishing these and other objects, according to one preferred embodiment of the present invention, there is provided a clutch motor arrangement including an electric motor equipped with a fly wheel mounted on a motor output shaft of the electric motor and a clutch mechanism movably supported so as to reciprocate in an axial direction of the electric motor for selective contact with and spacing from the fly wheel through operation of a clutch operating lever so as to intermittently transmit torque of the electric motor to a clutch output shaft of the clutch mechanism by operating the clutch operating lever, which further comprises a control device for controlling voltage to be applied to the electric motor, and a detection device for detecting functioning of the clutch mechanism, and arranged to apply to the electric motor, full power source voltage and voltage close thereto during an operative ON state of the clutch mechanism and to apply to the electric motor, voltage lower than the power source voltage during an inoperative OFF state of the clutch mechanism.

By the arrangement of the present invention as described above, an improved clutch motor arrangement for use in industrial sewing machines and the like has been advantageously presented at a reduced power consumption, with suppressed vibrations and noises during shut-down of the motor, and substantially elimination of disadvantages inherent in the conventional clutch motor arrangement of this kind.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
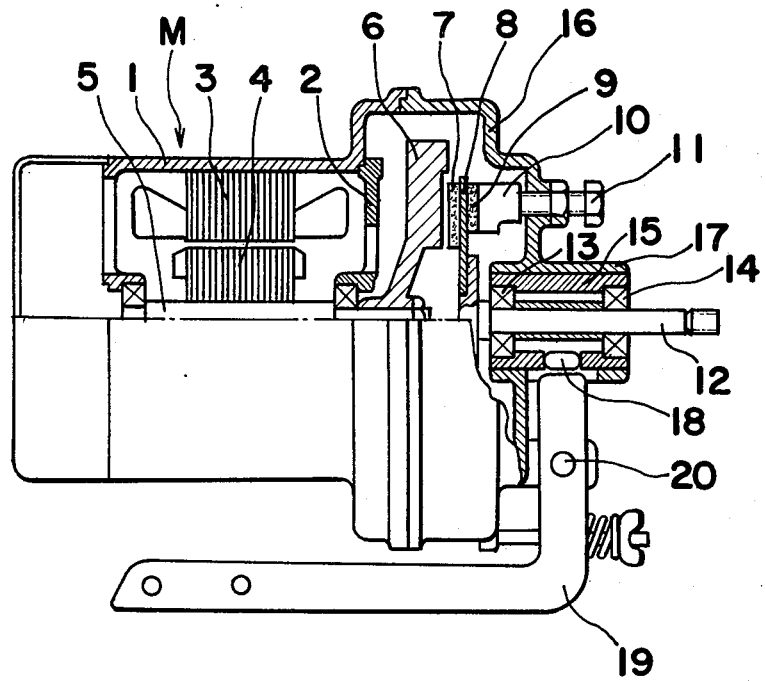
FIG. 1 is a side elevational view, partly broken away, of a conventional clutch motor arrangement.

Before the description of the present invention proceeds, it is to be noted that like parts are designated by like reference numerals throughout the several views of the accompanying drawings.

Referring now to the drawings, there is shown in FIG. 1 a conventional clutch motor arrangement which generally includes a clutch motor M having a frame 1, a bracket 2, a stator 3, a rotor 4 and a motor output shaft 5, a fly wheel 6 mounted on the motor output shaft 5, a clutch disc 8 on which is mounted a clutch friction material 7 to be engaged with the fly wheel 6, a brake base 10 on which a brake friction material 9 is mounted, a brake adjusting bolt 11 for adjusting the brake, a clutch output shaft 12 to which the clutch disc 8 is secured, ball bearings 13 and 14 respectively provided in a cylinder 15 at the side remote from a load and at the load side for rotatably supporting the clutch output shaft 12, a clutch bracket 16 having a cylindrical portion 17 for movably supporting therein the cylinder 15 for reciprocation in the axial direction, a pin 18 fitted in the cylinder 15, a clutch operating lever 19 for operating the clutch, and a shaft 20 for pivotally supporting clutch operating lever 19.

In the above known arrangement, during a sewing operation, the clutch motor M equipped with the fly wheel 6 is normally rotating, and the clutch disc 8 secured to the clutch output shaft 12 is arranged to axially move between the fly wheel 6 and brake friction plate 9 through the pin 18, cylinder 15, and ball bearings 13 and 14 for external transmission of the motor torque and brake operation.

Generally, a clutch motor, for example of a single phase 200 W type, has such a power consumption that, when an industrial sewing machine is driven at the rated output of 200 W, the motor requires an input of approximately 300 W, and even when the sewing machine is not being driven, an input of approximately 100 W is required for operating the motor under a non-load condition. On the assumption that the working efficiency of the industrial sewing machine is 30% as stated earlier, the average power consumption of the above clutch motor of the single phase 200 W type is represented by, $$(300 \text{ W} \times 30\% + 100 \text{ W} \times 70\%) \div 100 = 160 \text{ W}.$$

In the conventional arrangement, reduction of the power consumption is intended to be achieved by a decrease of the input during the loading period through improvement of the efficiency of the motor, and also by a decrease of the input during the non-load period, and thus, it has been difficult to achieve a large effect thereby.

On the contrary, the present invention is based on the principle of lowering the voltage to be impressed to the motor during the non-load period of the motor for reduction of power consumption at such non-load period.

Figure 2:
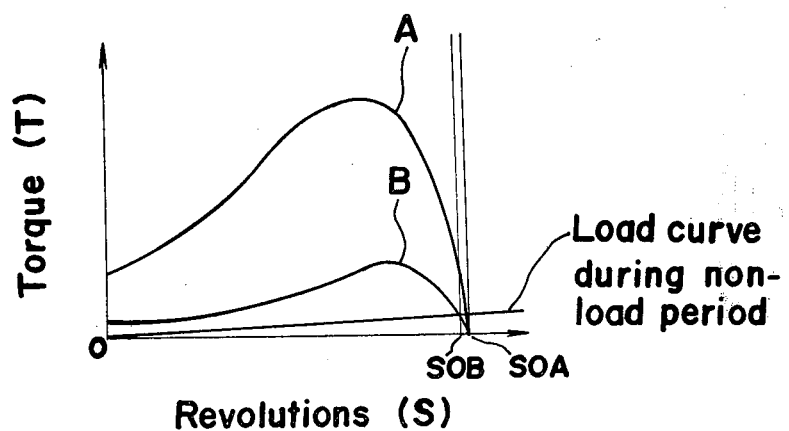
FIG. 2 is a graph explanatory of the principle of a clutch motor arrangement according to the present invention.

Commonly, in a clutch motor, it is necessary to keep the fly wheel rotating at a speed close to the synchronous speed even during the non-load period. However, as shown in FIG. 2, if the voltage to be applied to the motor is lowered, although the torque of the motor is reduced, with a S-T or speed-torque curve varying from the state represented by a curve A to that shown by a curve B in FIG. 2, since the load at the non-load period is very small and limited only to windage loss, mechanical loss at the bearings, etc., the load curve takes the form as shown, with merely a slight reduction of the motor revolutions during the non-load operation from $S_{OA}$ to $S_{OB}$, thus inviting substantially no problem during actual use.

Accordingly, for example, if the voltage to be applied to the motor during the non-load period of the clutch motor of the single phase 200 W type is reduced from 100 V to 50 V, the input at the non-load period becomes approximately 25 W, and therefore, the average power consumption for the clutch motor is represented by, $$(300 \text{ W} \times 30\% + 25 \text{ W} \times 70\%) \div 100 = 109 \text{ W}$$

which is a reduction of the power consumption as far as approximately 30% as compared with the conventional arrangement.

Figure 3:
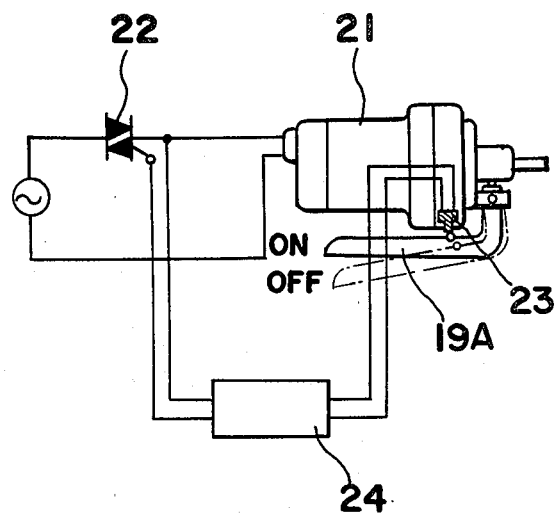
FIG. 3 is a block diagram showing the construction of a clutch motor arrangement according to one preferred embodiment of the present invention.

Referring now to FIG. 3, there is shown a clutch motor arrangement according to one preferred embodiment of the present invention which is applied to a clutch motor of a single phase type. The clutch motor arrangement of FIG. 3 generally includes a clutch motor 21, a bi-directional three-terminal thyristor 22 connected in series with the motor 21, a detection device 23 so provided as to detect the positions of a clutch operating lever 19A, and a control circuit 24 inserted between the detection device 23 and the thyristor 22 for transmitting predetermined gate signals to the thyristor 22 through corresponding signals from the detection device 23.

It should be noted here that other constructions of the clutch motor arrangement of FIG. 3 are generally similar to those of FIG. 1, and therefore, a detailed description thereof is omitted herein for the sake of brevity.

Figure 4:
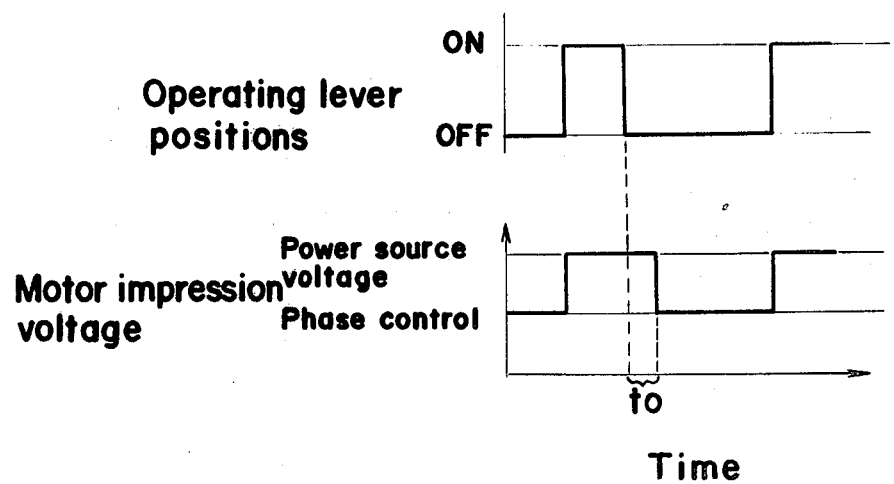
FIGS. 4 through 7 are diagrams and graphs explanatory of the functions of the clutch motor arrangement of FIG. 3.

Referring also to a diagram of FIG. 4 showing the relation between the positions of the operating lever 19A and the voltages to be applied to the motor 21 for explaining the functioning of the arrangement of FIG. 3, when the operating lever 19A is in the inoperative OFF position, a gate signal for effecting a preliminarily set phase control is transmitted from the control circuit 24 to the bi-directional three-terminal thyristor 22, whereby a predetermined voltage lower than the power source voltage is impressed to the motor 21. Upon changing over of the positions of the operating lever 19A from the inoperative OFF position to the operative ON position, the above state is detected by the detection device 23, and thus, a gate signal for full conduction of the thyristor 22 is instantly transmitted to the bi-directional three-terminal thyristor 22 from the control circuit 24, while the full power source voltage is applied as it is to the motor 21. Meanwhile, when the positions of the operating lever 19A have been changed over from the operative ON position to the inoperative OFF position, the state is detected by the detection device 23, while the gate signal for effecting the preliminarily set phase control is fed to the thyristor 22 from the control circuit 24 at a predetermined time delay of $t_0$ second, and the functions as described in the foregoing are repeated henceforth.

Figure 5:
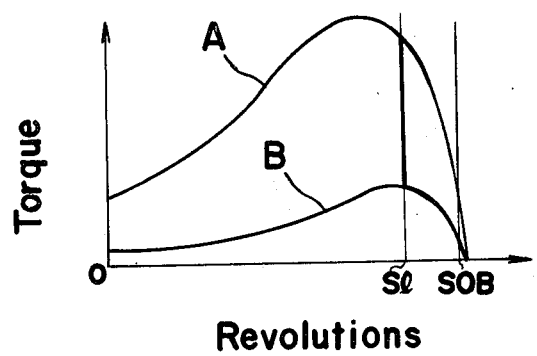
Figure 6:
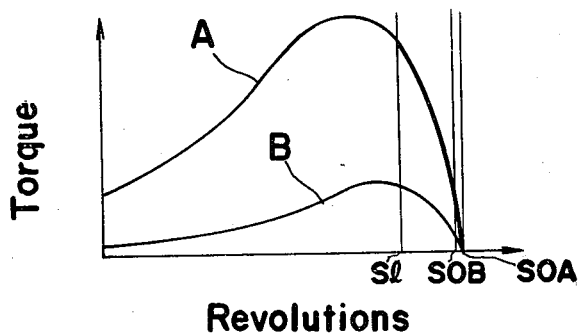

When the positions of the operating lever 19A are changed over from the ON position to the OFF position, if the change-over from full conduction to phase control is momentarily effected, the S-T curves instantly change from the curve A to curve B as shown in FIG. 5, and since it is necessary to accelerate the revolutions of the motor rendered to be Sl due to application of the load, up to $S_{OB}$ through a small torque, a considerably long period of time is required for such purpose.

However, if full conduction is maintained after the predetermined time delay of $t_0$ second, even upon change-over of the positions of the operating lever 19A from the ON position to the OFF position, the revolutions of the motor rendered to be Sl due to the application of the load are accelerated up to a large torque $S_{OA}$, and thus, it is possible to return to $S_{OB}$ in a short period of time.

It should be noted here that in the absence of the delay function as described above, the functioning can not catch up with the inching operation in which the positions of the operating lever 19A are rapidly changed over in such a manner as in a successive change-over through ON, OFF, ON, and OFF positions.

Figure 7:
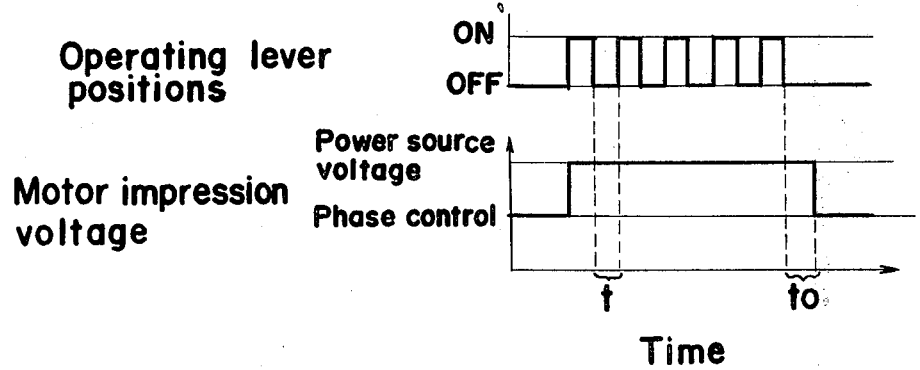

However, by the delayed functioning provided in the present invention as described earlier, since the full voltage is continuously applied to the motor even during the inching operation in which the time t for the OFF period is shorter than the delayed time $t_0$, the clutch motor can be provided with a sufficient torque as shown in FIG. 7.

Figure 8:
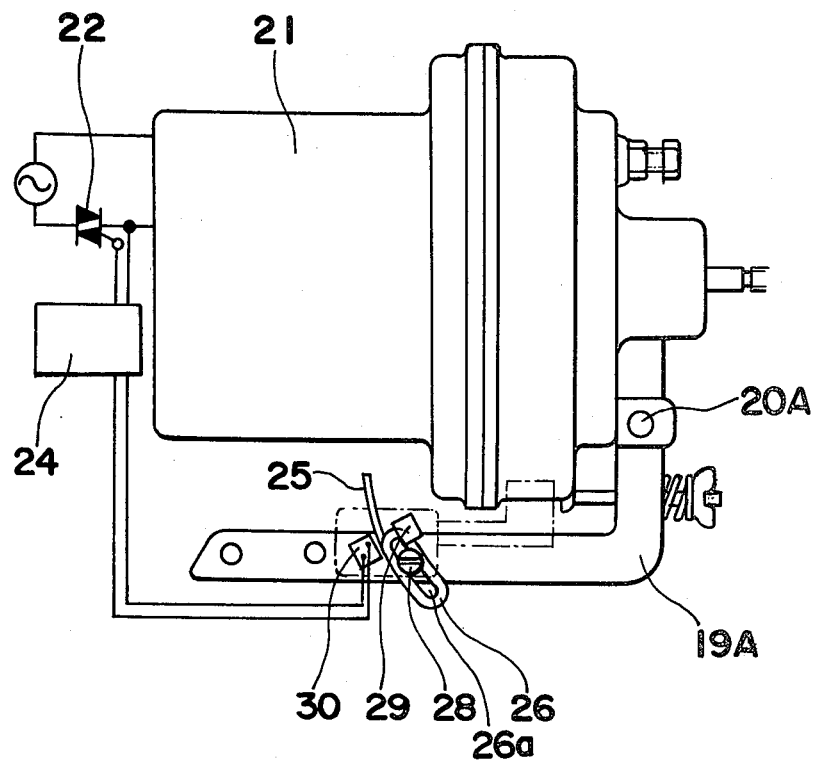
FIG. 8 is a side elevational view of the clutch motor arrangement according to the present invention particularly showing the structure of a detection device employed therein.
Figure 9:
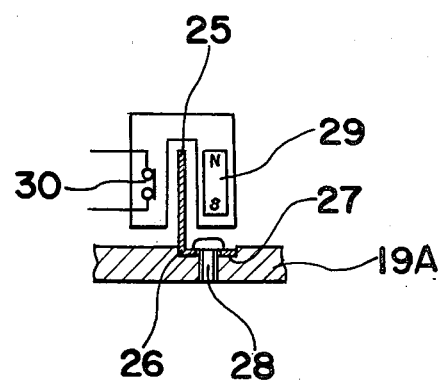
FIG. 9 is a fragmentary side sectional view showing, on an enlarged scale, the structure of the detection device employed in the arrangement of FIG. 8.

Reference is made to FIGS. 8 and 9 showing the detailed structure of the detection device 23 employed in the clutch motor arrangement of the present invention referred to in FIG. 3.

The detection device 23 for detecting whether the operating lever 19A is in the inoperative OFF position or in the operative ON position, generally includes a support plate 26 having an elongated opening 26a defined therein and movably fitted in a guide groove 27 (FIG. 14) formed in the operating lever 19A for guiding the support plate 26 to any position on an arcuate path about the pivotal axis 20A of the lever 19A, a fixing screw 28 threaded into the lever 19A through the elongated opening 26a of the support plate 26 for fixing support plate 26 at any desired position in the guide groove 27, a magnetic shielding plate 25 integrally formed with or rigidly connected to the support plate 26 so as to extend upwardly from one end of support plate 26, permanent magnet member 29 fixedly provided on a frame (not shown) or the like of the clutch motor arrangement in a position adjacent to one side of the magnetic shielding plate 25, and a magnetic sensing element, for example, a lead switch 30 also fixedly provided on a frame (not shown) or the like of the clutch motor arrangement in a position adjacent to the other side of the magnetic shielding plate 25 so as to confront the permanent magnet member 29 through support plate 26 and magnetic shielding plate 25.

Figure 10:
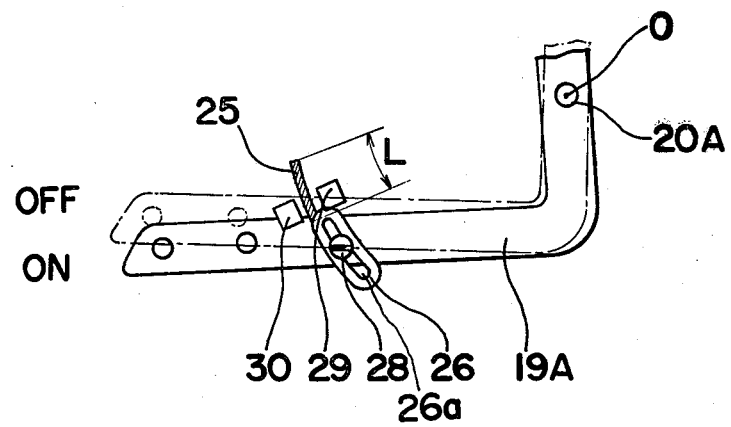
FIG. 10 is a fragmentary side elevational view showing, on an enlarged scale and partly in section, the clutch operating lever employed in the arrangement of FIG. 3 for explaining the function thereof.

In the above arrangement, as shown by the chain line position in FIG. 10, when the operating lever 19A is in the OFF position, the magnetic shielding plate 25 which has been moved upwardly together with the support plate 26 is spaced from the magnet member 29, and thus, the lead switch 30 which is not shielded from magnetic flux of the permanent magnet member 29 is in the turned-on state. Meanwhile, as shown by the solid line position in FIG. 10, when the operating lever 19A is brought to the ON position, the magnetic shielding plate 25 is lowered between the magnet member 29 and lead switch 30 so as to shield lead switch 30 from magnetic flux of the magnet member 29, and thus, the lead switch 30 is turned off. In other words, the control circuit 24 connected between the lead switch 30 and the thyristor 22 is capable of judging whether the operating lever 19A is in the OFF position or in the ON position.

Figure 11:
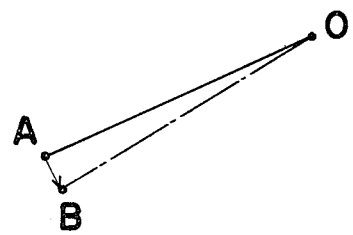
FIGS. 11 to 13 are diagrams explanatory of the functioning of the clutch operating lever of FIG. 10.

Initially, when the operating lever 19A is moved from the OFF position to the ON position, the magnetic shielding plate 25 is displaced from the point A to point B on a concentric arcuate path about the center O of the pivotal axis 20A as shown in FIG. 11. Meanwhile, as shown in FIG. 12, upon abrasion of the brake friction material 9 (FIG. 1), the OFF position of the operating lever 19A is displaced from the point A to point C, while upon wearing of the clutch friction material 7 (FIG. 1), the ON position of the control lever 19A is moved from the point B to point D, and when the operating lever 19A is changed over from the OFF position to the ON position, the magnetic shielding plate 25 is to be displaced from the point C to point D along the concentric arcuate path about the center O of the pivotal axis 20A.

Figure 12:
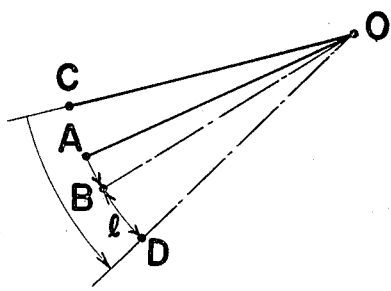
Figure 13:
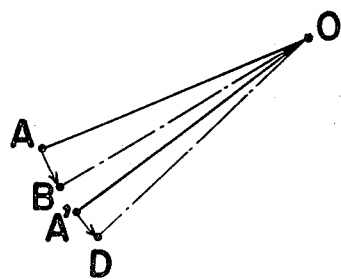
Figure 14:
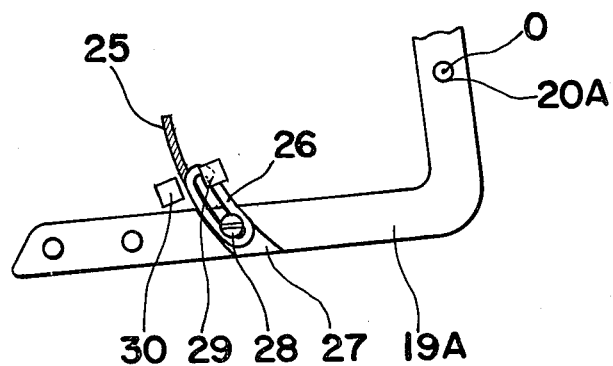
FIG. 14 is a view similar to FIG. 10, which particularly shows adjustment of a support plate employed therefor.

However, according to the present invention, even when the brake friction material 9 and clutch friction material 7 are abraded, it is possible to detect the OFF and ON positions of the operating lever 19A as in the original state only by making the length L (FIG. 10) of the magnetic shielding plate 25 longer than the maximum variation amount l of the operating point due to abrasion of the clutch friction material 7 as shown in FIG. 12. Furthermore, although the operation of the lever 19A may become rather difficult if the moving distance of lever 19A is increased from the points A to B to the points C to D, by adjusting the position of the brake friction material 9 with the brake adjusting bolt 11 (FIG. 1), the moving distance of the operating lever 19A may be reduced to the points B to D as shown in FIG. 13. In the above case, although the functioning point of the operating lever position detection device may be varied, this is corrected merely by moving the support plate 26 along the guide groove 27 as shown in FIG. 14, and thus, according to the present invention, the correction and maintenance of the operating lever position detection device are very readily effected by the brake adjusting bolt 11.

It should be noted here that, in the above embodiment, although the present invention is mainly described with reference to single phase motor, the present invention is not limited in its application to a single phase motor alone, but may readily be applicable to three-phase motors and the like based on the same principle as described in the foregoing.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as included therein.

What is claimed is:

1. A clutch motor arrangement including an electric motor equipped with a fly wheel mounted on a motor output shaft of the electric motor and a clutch mechanism movably supported so as to reciprocate in an axial direction of said electric motor to be selectively brought into contact with and spaced from said fly wheel through operation of a clutch operating lever so as to intermittently transmit torque of the electric motor to a clutch output shaft of said clutch mechanism by operating said clutch operating lever, said clutch motor arrangement further comprising a detection device operatively positioned for detecting functioning of said clutch mechanism, and control means for controlling voltage applied to said electric motor and including a control device connected between said detection device and said electric motor and responsive to said detection device to apply to said electric motor full power source voltage and voltage close thereto during an operative ON state of said clutch mechanism, and to apply to said electric motor voltage lower than the power source voltage during an inoperative OFF state of said clutch mechanism.

2. A clutch motor arrangement as claimed in claim 1, wherein said control device includes a thyristor element connected in series with said electric motor and a control circuit for controlling the conduction angle of said thyristor element so that, by the output signal of said detection device which detects positions of said clutch operating lever, said thyristor element is rendered to be fully conductive so as to apply said full power source voltage to said electric motor when said clutch operating lever is in said operative ON position, and said thyristor element is subjected to phase control so as to apply part of said full power source voltage to said electric motor when said clutch operating lever is in said inoperative OFF position.

3. A clutch motor arrangement as claimed in claim 2, wherein said thyristor element is a thyristor of inverted parallel connection.

4. A clutch motor arrangement as claimed in claim 2, wherein said thyristor element is a bi-directional three-terminal thyristor.

5. A clutch motor arrangement as claimed in claim 2, wherein said thyristor element of said control device is arranged to be instantly changed over from the state subjected to phase control to the fully conductive state upon changing over of the positions of said clutch operating lever from said inoperative OFF position to said operative ON position, and also to be changed over, through a predetermined period of time delay, from said fully conductive state to said state subjected to phase control upon changing over of the positions of said clutch operating lever from said operative ON position to said inoperative OFF position.

6. A clutch motor arrangement as claimed in claim 1, wherein said detection device comprises a magnet member and a magnetic sensing element disposed to confront each other, and a magnetic shielding plate arranged to be movable in a space between said magnet member and said magnetic sensing element.

7. A clutch motor arrangement as claimed in claim 6, wherein said magnetic shielding plate is movably disposed in a guide groove formed in said clutch operating lever.

8. A clutch motor arrangement as claimed in claim 7, wherein said guide groove is so formed as to guide said magnetic shielding plate to any desired position on an arcuate path centered at a pivotal axis supporting said clutch operating lever.

* * * * *